US009648231B2

(12) United States Patent
Toguchi (10) Patent No.: US 9,648,231 B2
(45) Date of Patent: May 9, 2017

(54) IMAGE PICKUP APPARATUS HAVING PLURALITY OF IMAGE PICKUP UNITS, CONTROL METHOD THEREFOR, AND STORAGE MEDIUM

(71) Applicant: CANON KABUSHIKI KAISHA, Tokyo (JP)

(72) Inventor: Kazuomi Toguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/751,550

(22) Filed: Jun. 26, 2015

(65) Prior Publication Data

US 2015/0381889 A1  Dec. 31, 2015

(30) Foreign Application Priority Data

Jun. 30, 2014 (JP) ................. 2014-133999

(51) Int. Cl.
*H04N 5/228* (2006.01)
*H04N 7/18* (2006.01)
*H04N 5/225* (2006.01)
*H04N 5/232* (2006.01)

(52) U.S. Cl.
CPC ....... *H04N 5/23222* (2013.01); *H04N 5/2258* (2013.01); *H04N 5/23219* (2013.01)

(58) Field of Classification Search
USPC ........................ 382/165, 190–192, 203, 219; 348/208.12, 143, 158, 159, 169, 208.14, 348/376
See application file for complete search history.

(56) References Cited

U.S. PATENT DOCUMENTS

| | | | | |
|---|---|---|---|---|
| 2011/0053654 A1* | 3/2011 | Petrescu | ............ | H04N 5/23219 455/566 |
| 2011/0317031 A1* | 12/2011 | Honda | ............... | H04N 5/23219 348/229.1 |
| 2012/0057039 A1* | 3/2012 | Gardiner | ............ | H04N 5/23219 348/222.1 |
| 2014/0361986 A1* | 12/2014 | Won | ................... | H04N 1/00307 345/156 |

FOREIGN PATENT DOCUMENTS

JP  2006-005662 A  1/2006

\* cited by examiner

*Primary Examiner* — Lin Ye
*Assistant Examiner* — Euel Cowan
(74) *Attorney, Agent, or Firm* — Cowan, Liebowitz & Latman, P.C.

(57) ABSTRACT

An image pickup apparatus which is capable of reducing erroneous shooting when a third party other than a photographer has come within the field of view. A first detection unit detects a subject from first image data obtained as a result of shooting by a first image pickup unit. A second detection unit detects a subject from second image data obtained as a result of shooting by a second image pickup unit. When the first detection unit detects, from the first image data, the subject detected by the second detection unit, a shooting process is carried out in which a shooting operation is performed using the first image pickup unit, and image data obtained by the shooting operation is recorded.

10 Claims, 4 Drawing Sheets

IMAGE PICKUP APPARATUS HAVING PLURALITY OF IMAGE PICKUP UNITS, CONTROL METHOD THEREFOR, AND STORAGE MEDIUM

BACKGROUND OF THE INVENTION

Field of the Invention

The present invention relates to an image pickup apparatus, a control method therefor, and a storage medium, and in particular to an image pickup apparatus having a plurality of image pickup units.

Description of the Related Art

In general, image pickup apparatuses such as digital cameras which have a plurality of image pickup units are known. For example, there are image pickup apparatuses which have a first image pickup unit (hereafter referred to as the main camera unit) and a second image pickup unit (hereafter referred to as the sub camera unit), and in which the main camera unit is disposed on a front side, and the sub camera unit is disposed on a rear side.

In automatic shooting such as self-timer shooting, shooting may be performed upon a lapse of a predetermined time period after issuance of a shooting instruction. In self-timer shooting, shooting is automatically performed upon a lapse of a predetermined number of seconds, a photographer as well will be inside a photograph if he or she comes within the field of view within the predetermined number of seconds after self-timer shooting is selected.

There is known an image pickup apparatus which performs automatic shooting using a face detecting function (see Japanese Laid-Open Patent Publication (Kokai) No. 2006-5662). Here, when a photographer presses a shutter button all the way down (that is, when he or she issues a shooting instruction), the number of faces present within the field of view is detected, the number of detected faces is stored, and after that, when the number of faces within the field of view has increased, shooting is automatically performed.

However, in the image pickup apparatus according to Japanese Laid-Open Patent Publication (Kokai) No. 2006-5662, even when a third party has come within the field of view after the shutter button was pressed all the way down, the image pickup apparatus may falsely recognize that a person such as a photographer has come within the field of view and automatically perform shooting.

SUMMARY OF THE INVENTION

The present invention provides an image pickup apparatus, a control method therefor, which are capable of reducing erroneous shooting when a third party other than a photographer has come within the field of view in an automatic shooting mode, as well as a storage medium.

Accordingly, the present invention provides an image pickup apparatus having a first image pickup unit and a second image pickup unit, comprising a first detection unit configured to detect a subject from first image data obtained as a result of shooting by the first image pickup unit, a second detection unit configured to detect a subject from second image data obtained as a result of shooting by the second image pickup unit, and a control unit configured to provide control to, in response to said first detection unit detecting, from the first image data, the subject detected by said second detection unit, carry out a shooting process in which a shooting operation is performed using the first image pickup unit, and image data obtained by the shooting operation is recorded.

According to the present invention, since main shooting is performed when a first detection result and a second detection result satisfy specific conditions set in advance, erroneous shooting is reduced when a third party other than a photographer has come within the field of view.

Further features of the present invention will become apparent from the following description of exemplary embodiments (with reference to the attached drawings).

BRIEF DESCRIPTION OF THE DRAWINGS

FIGS. 1A and 1B are views showing an exterior appearance of an image pickup apparatus according to an embodiment of the present invention, in which FIG. 1A is a view taken from front, and FIG. 1B is a view taken from behind.

DESCRIPTION OF THE EMBODIMENTS

A description will now be given of an exemplary image pickup apparatus according to an embodiment of the present invention.

Figure 1A:
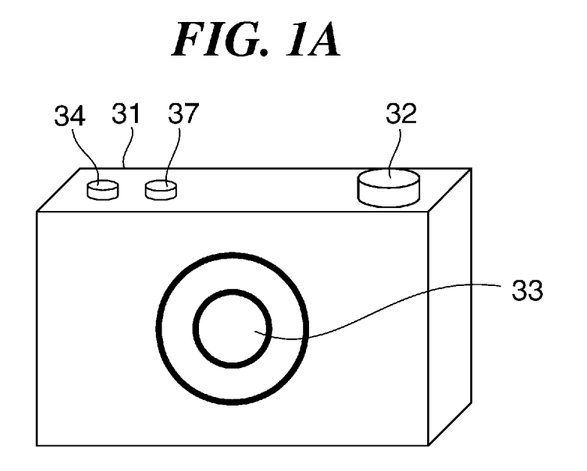
Figure 1B:
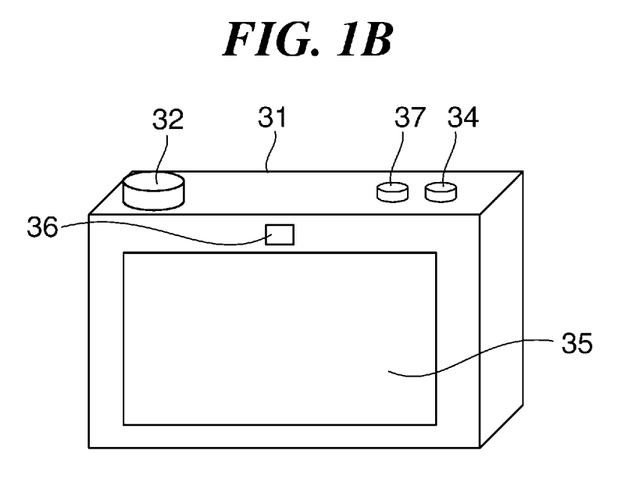

FIGS. 1A and 1B are views showing an exterior appearance of an image pickup apparatus according to an embodiment of the present invention, in which FIG. 1A is a view taken from front, and FIG. 1B is a view taken from behind.

The image pickup apparatus shown in the figure is, for example, a digital camera (hereafter referred to merely as the camera) 31, and a power switch 32, a release switch 34, and a shooting mode selector switch 37 are disposed on an upper surface of the camera 31. The power switch 32 is for use in tuning on or off the power to the camera 31. The release switch 34 is a pushbutton switch for use in giving a shooting instruction. The shooting mode selector switch 37 is a pushbutton switch for use in switching between a shooting mode and a reproducing mode.

A taking lens unit (hereafter referred to merely as the taking lens) 33 is disposed on a front side of the camera 31. A subject image is formed on an image pickup device through the taking lens 33 as will be described later. Namely, the taking lens 33 is used to shoot a subject.

An LCD 35, which is a display unit, is disposed on a rear side of the camera 31, and an image and various information are displayed on the LCD 35. A sub lens unit (hereafter referred to merely as the sub lens) 36 is disposed on an upper side of the LCD 35. A photographer image is formed on the image pickup device through the sub lens 36. Namely, the sub lens 36 is used to shoot a photographer who is a user.

Figure 2:
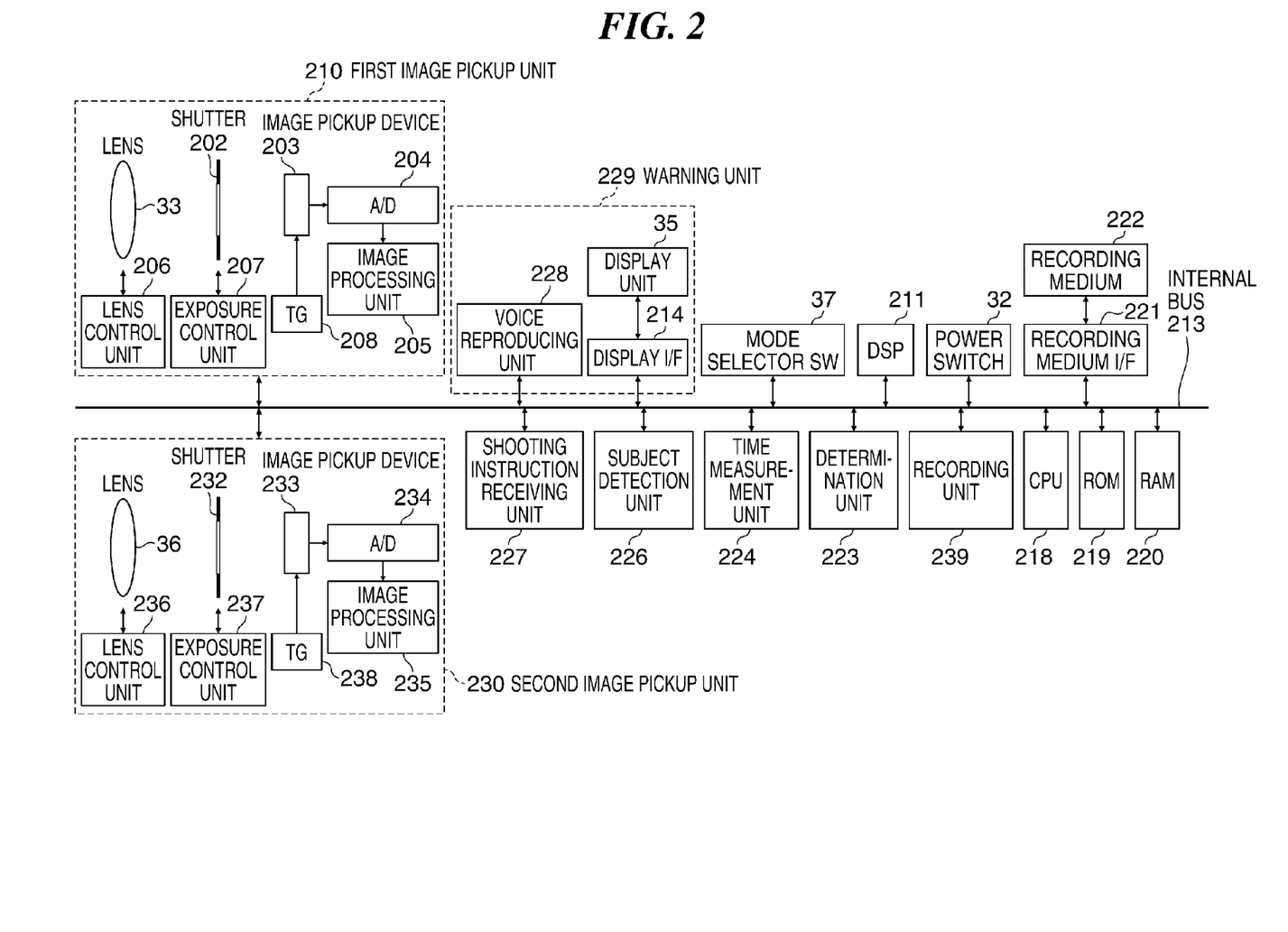
FIG. 2 is a block diagram showing an exemplary arrangement of a camera in FIGS. 1A and 1B.

FIG. 2 is a block diagram showing an exemplary arrangement of the camera 31 in FIGS. 1A and 1B.

The camera 31 shown in the figure has a first image pickup unit (main camera unit) 210 and a second image pickup unit (sub camera unit) 230, and the first and second image pickup units 210 and 230 have the taking lens 33 and the sub lens 36, respectively, described above.

As shown in the figure, the first image pickup unit 210 has a shutter 202 equipped with a diaphragm, an image pickup device 203, an A/D converter 204, an image processing unit 205, a lens control unit 206, an exposure control unit 207, and a timing generator (TG) 208. When an image of a subject is taken by the first image pickup unit 210, subject image data (first image data) is generated as will be described later.

Likewise, the second image pickup unit 230 has a shutter 232 equipped with a diaphragm, an image pickup device 233, an A/D converter 234, an image processing unit 235, a lens control unit 236, an exposure control unit 237, and a TG 238. When an image of a photographer is taken by the second image pickup unit 230, photographer image data (second image data) is generated as will be described later. For the A/D converter 204(234), the image processing unit 205(235), the lens control unit 206(236), the exposure control unit 207(237) and the TG 208(238), dedicated circuits may be used, or programmed processors may be used. Moreover, one processor may execute processing for the plurality of these blocks.

The camera 31 has a CPU 218, a ROM 219, a RAM 220, a display I/F 214, a digital signal processor (DSP) 211, a recording medium I/F 221, a recording medium 222, a determination unit 223, a clocking unit 224, a subject detection unit 226, a shooting instruction receiving unit 227 (release switch 34), and a warning unit 229, as well as the mode selector switch SW 37 and the power switch 32 described above. They are connected to one another via an internal bus 213.

It should be noted that the warning unit 229 has the LCD 35 described above, and the LCD 35 is connected to the internal bus 213 by way of the display I/F 214. Further, the warning unit 229 has a voice reproducing unit 228 connected to the internal bus 213.

The CPU 218 plays a pivotal role in controlling the entire camera 31. The CPU 218 is started by turning-on of the power switch 32 and executes various programs, to be described later. The CPU 218 controls display on the LCD 35 by way of the display I/F 214. To suspend the display operation of the LCD 35, the supply of a synchronization signal and a data signal (including image data) to the LCD 35 is suspended.

Programs relating to procedures of operating processes carried out by the CPU 218 such as a process to start the camera 31, a basic input-output process, and processes which will be described later are recorded in the ROM 219. The RAM 220 is used as a work area for the CPU 218.

An image corresponding to subject image data obtained by the first image pickup unit 210 and an image correspond to photographer image data obtained by the second image pickup unit 230 as well as a graphic user interface (GUI) screen are displayed on the LCD 35 as will be described later. Also, a reproduced image is displayed on the LCD 35 when image data recorded on the recording medium 222 is reproduced. Further, various operating icons are displayed on the LCD 35.

The recording medium 222 is connected to the internal bus 213 via the recording medium I/F 221. The recording medium 222 is, for example, a nonvolatile memory such as a memory card or a hard disk, and image data is written into or read out from the recording medium 222 via the recording medium IF 221.

The recording unit 239 writes subject image data and photographer image data in the recording medium 222 by way of the recording medium I/F 221 under the control of the CPU 218. The clocking unit 224 is controlled by the CPU 218 and clocks a predetermined time period set in advance by a user. The shooting instruction receiving unit 227 (the release switch 34 shown in FIGS. 1A and 1B) receives a shooting instruction issued by a photographer who is a user.

The voice reproducing unit 228 reproduces a voice signal output from the CPU 218 and outputs the same as voice. The warning unit 229 displays a warning using the LCD 35 and warns a user through voice which is an output from the voice reproducing unit 228. For the CPU 218, the determination unit 223, the clocking unit 224, the subject detection unit 226, the recording unit 239, and so on, dedicated circuits may be used, or programmed processors may be used. Moreover, one processor may execute processing for the plurality of these blocks.

A description will now be given of how the first image pickup unit 210 and the second image pickup unit 230 operate. It should be noted that the first image pickup unit 210 and the second image pickup unit 230 operate in the same manner and differ only in terms of an object to be shot, and hence in the following description, the first image pickup unit 210 is focused.

A subject image (optical image) incident via the taking lens 33 and the shutter 202 is formed on the image pickup device 203. The image pickup device 203 outputs an electric signal (analog image signal) corresponding to the subject image. The A/D converter 204 carries out analog-to-digital conversion to convert the analog image signal output into a digital image signal. The TG 208 supplies a clock signal and a control signal to the image pickup device 203 and the A/D converter 204 under the control of the CPU 218.

In response to the digital image signal from the A/D converter 204, the image processing unit 205 carries out a predetermined pixel interpolation process and a predetermined color conversion process to generate subject image data. The image processing unit 205 also carries out a predetermined computation process on the subject image data. Based on a computation result obtained by this computation process, the CPU 218 performs auto-focus (AF) processing and auto-exposure (AE) processing.

Further, the image processing unit 205 carries out a predetermined computation process on the subject image data, and based on the computation result, performs TTL auto-white balance (AWB) processing. It should be noted that the image processing unit 205 carries out a predetermined pixel interpolation process and a predetermined color conversion process on image data stored in the RAM 220 as well.

The exposure control unit 207 controls the shutter 202 having the diaphragm under the control of the CPU 218. The lens control unit 206 provides focusing control for the taking lens 33 and zooming control under the control of the CPU 218. The exposure control unit 207 and the lens control unit 206 are controlled by the CPU 218 using the TTL method. The CPU 218 causes the first image pickup unit 210 to suspend its shooting operation. On this occasion, the CPU 218 stops operations of the image pickup device 203, the A/D converter 204, the image processing unit 205, the lens control unit 206, the exposure control unit 207, and the TG 208.

The image pickup unit 230 is controlled in the same manner as the first image pickup unit 210 to generate photographer image data.

The subject detection unit 226 detects a specific subject in subject image data or photographer image data under the control of the CPU 218. A specific subject means a subject having a specific color, a specific object, or a specific form, and in the example shown in the figure, the subject detection unit 226 detects a specific subject based on a face or eyes of a person. In the following description, a face detection unit is taken as an example of the subject detection unit 226.

The face detection unit carries out a horizontal-direction bandpass filter process on subject image data and photographer image data under the control of the CPU 218. The face detection unit then carries out a vertical-direction bandpass filter process on the subject image data and the photographer image data that have been subjected to the horizontal-direction bandpass filter process. As a result of the horizontal- and vertical-direction bandpass filter processes, the face detection unit detects edge components in each of the subject image data and the photographer image data.

After that, the CPU 218 carries out a pattern matching process for the detected edge components to extract potential groups of eyes, nose, mouth, and ears. The CPU 210 then determines that among the extracted potential groups of eyes, one which satisfies conditions set in advance (for example, the distance between two eyes and the gradient of them) is a pair of eyes and narrows the potential groups of eyes down to one having the pair of eyes.

The CPU 218 associates the narrowed potential group of eyes with other parts (nose, mouth, and ears) forming a face and also detects a face (face region) through a non-face condition filter set in advance. The CPU 218 stores the face region detection result as face information in the RAM 220. Thus, image data displayed in live view or displayed while being reproduced is subjected to image analysis, and a face region which is a feature in the image data is extracted to generate face information which is a piece of subject information. As a result, an individual is identified.

It should be noted that in the above description, face information is taken as an example of subject information, but there are a variety of subject information such as information obtained by red-eye determination and detection, closed-eye detection, and smile detection as well as face information.

The determination unit 223 determines, under the control of the CPU 218, whether or not the relationship between subject image data and photographer image data satisfy specific conditions. Here, the specific conditions mean conditions for determining whether or not subject information (here, face information) obtained from photographer image data is present in subject information (here, face information) obtained from subject image data.

It should be noted that the DSP 211 carries out a variety of processes on subject image data and photographer image data under the control of the CPU 218.

Figure 3A:
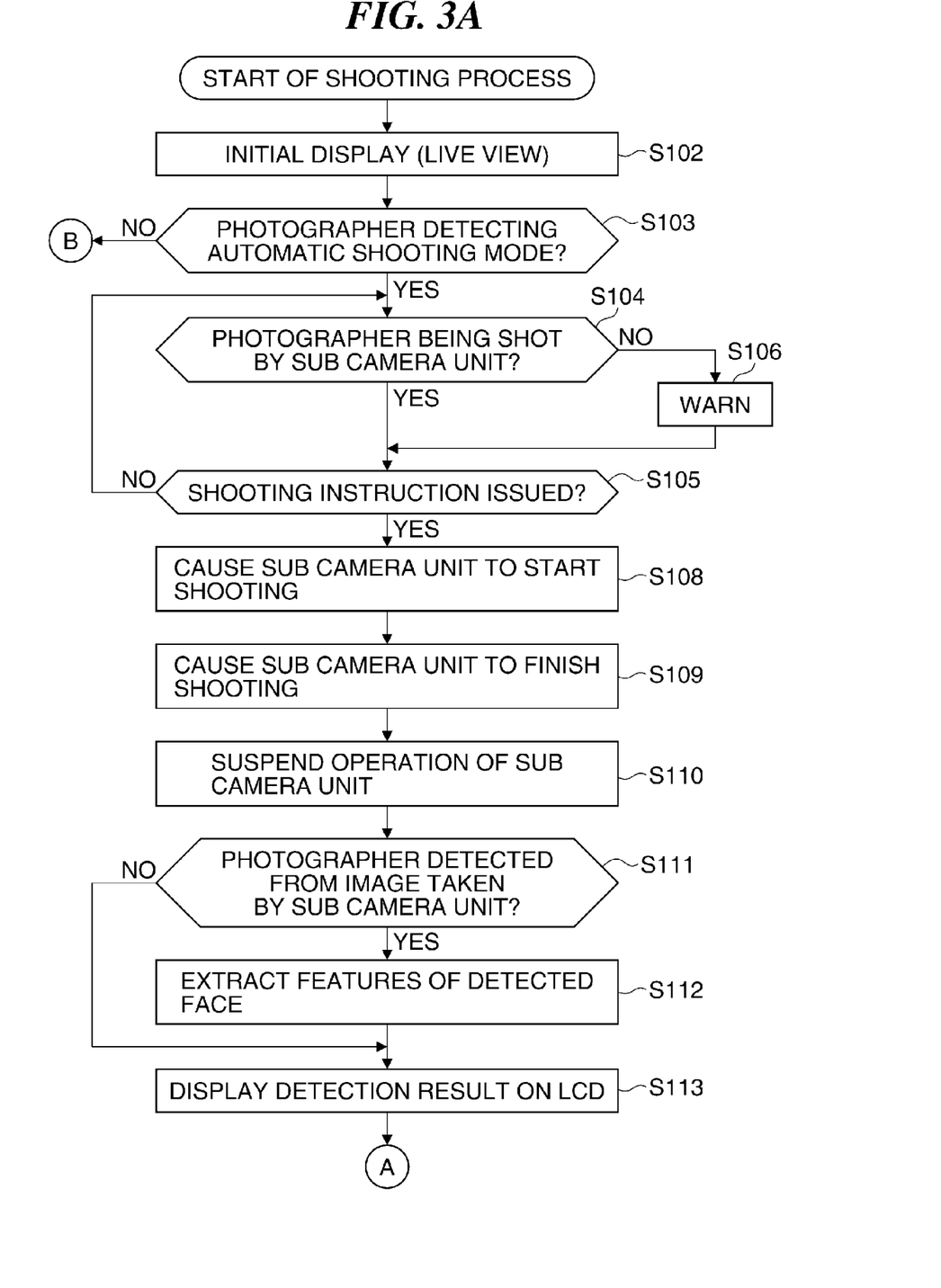
FIGS. 3A and 3B are flowcharts useful in explaining an exemplary shooting process which is carried out by the camera in FIG. 2.
Figure 3B:
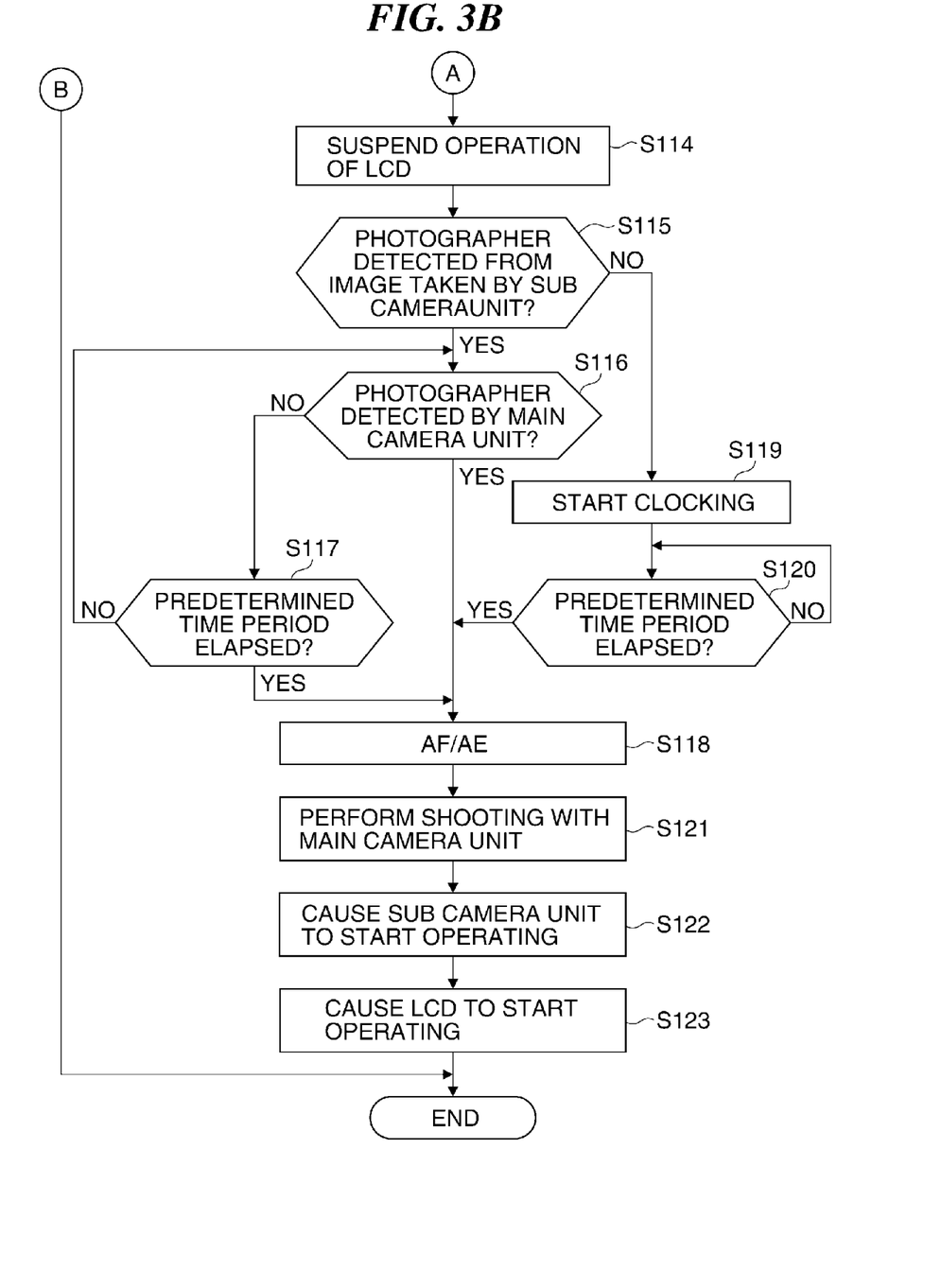

FIGS. 3A and 3B are flowcharts useful in explaining an exemplary shooting process which is carried out by the camera 31 in FIG. 2.

It should be noted that in the following description, it is assumed that the camera 31 is placed in a photographer detecting automatic shooting mode using the mode selector SW 37. In the photographer detecting automatic shooting mode, a photographer who is a user is shot by the sub camera unit 230, and after that, when the photographer is detected by the main camera unit 210, shooting is performed by the main camera unit 210.

When the power to the camera 31 is turned on, and the operation mode of the camera 31 is switched to a shooting mode, the CPU 218 displays a live view of image data obtained by the main camera unit 210 and the sub camera unit 230 (step S102). The CPU 218 then judges whether or not the photographer detecting automatic shooting mode has been selected using the mode selector switch SW 37 (step S103). When the photographer detecting automatic shooting mode has not been selected (NO in the step S103), the CPU 218 terminates the shooting process.

On the other hand, when the photographer detecting automatic shooting mode has been selected (YES in the step S103), the CPU 218 judges whether or not a face region of a photographer has been detected from image data (photographer image data) obtained by the sub camera unit 230 (step S104). When the face region of the photographer has been detected (YES in the step S104), the CPU 218 waits to receive a shooting instruction and judges whether or not a shooting instruction has been issued (step S105).

On the other hand, when the face region of the photographer has not been detected (NO in the step S104), the CPU 218 causes the warning unit 229 to warn the photographer who is a user (step S106). For example, the CPU 218 displays a warning to the effect that the face region of the photographer has not been detected. At the time of displaying this warning, the CPU 218 displays a guidance to instruct a face of a photographer to be inside the field of view of the sub camera unit 230. The CPU 218 then starts the process in the step S105.

It should be noted that when, after issuing the warning in the step S106, the CPU 218 starts the process in the step S105 in a state where the face of the photographer has not been detected, the CPU 218 may, for example, display on the LCD 35 a message to the effect that shooting is to be performed after 10 seconds are clocked after a shooting instruction is received.

In the process in the step S105, the CPU 218 judges whether or not the release SW 34 has been operated by the photographer who is the user to issue a shooting instruction. When the CPU 218 judges that no shooting instruction has been issued (NO in the step S105), the process returns to the step S104. On the other hand, when a shooting instruction has been issued (YES in the step S105), the CPU 218 causes the sub camera unit 230 to shoot a rear side of the camera 31 (step S108). It should be noted that image data obtained in the step S108 need not be recorded in the recording medium 222.

After shooting with the sub camera unit 230, the CPU 218 brings shooting with the sub camera unit 230 to an end (step S109). After that, the CPU 218 suspends the image pickup operation of the sub camera unit 230 (step S110). This reduces power consumed by the image pickup operation of the sub camera unit 230.

The CPU 218 then judges whether or not a human face, that is, the face of the photographer has been detected in the image data (photographer image data) obtained in the step S108 using the subject detection unit 226 (step S111). When the face of the photographer has been detected in the photographer image data (YES in the step S111), the CPU 218 extracts feature quantities which represent features of the face of the photographer (step S112). The CPU 218 then expands the feature quantities on the RAM 220 by way of the internal bus 213.

The CPU 218 then displays a judgment result obtained in the process in the step S111 on the LCD 35 (step S113). It should be noted that when the CPU 218 judges that no human face in the photographer image data has been detected (NO in the step S111), the process proceeds to the step S113. Here, when a human face is detected, the CPU 218 displays on the LCD 35 a judgment result indicating that a face has been detected. On the other hand, when no human face is detected, the CPU 218 displays on the LCD 35 a judgment result indicating that no face has been detected.

It should be noted that when a human face is detected in the step S111, for example, the CPU 218 may display on the LCD 35 a message to the effect that shooting is to be performed when the face of the photographer is detected in image data obtained by the main camera unit 210. When no human face is detected, for example, the CPU 218 may display on the LCD 35 a message to the effect that shooting is to be performed by the main camera unit 210 after a lapse of 10 seconds from now.

The CPU 218 then suspends the display operation of the LCD 35 (step S114). As a result, the CPU 218 reduces power consumed by the display operation of the LCD 35. Then, in the same manner as in the process in the step S111, the CPU 218 judges whether or not the face of the photographer has been detected in the image data obtained by the main camera unit 210 has been detected (step S115).

When the face of the photographer in the image data obtained by the sub camera unit 230 has been detected (YES in the step S115), the CPU 218 judges whether or not a face having the same feature quantities as those of the face extracted in the step S112 is detected from the image data obtained by the main camera unit 210. Namely, the CPU 218 judges whether or not the face of the photographer obtained by the sub camera unit 230 is present in the image data obtained by the main camera unit 210 (step S116).

When the face of the photographer is not present in the image data obtained by the main camera unit 210 (NO in the step S116), the CPU 218 judges whether or not a predetermined time period has elapsed in a state where the photographer is not detected (step S117). The CPU 218 carries out the process in the step S116 repeatedly to judge whether or not the face of the photographer is present until the predetermined time period has elapsed in the state where the photographer is not detected (NO in the step S117).

When the predetermined time period has elapsed in the state where the photographer is not detected (YES in the step S117), the CPU 218 performs AF and AE processing as a preparation for shooting with the main camera unit 210 so that shooting with the main camera unit 210 can be started (step S118). When the face of the photographer is present in the image data obtained by the main camera unit 210 (YES in the step S116), the process proceeds to the step S118 in which the CPU 218 in turn performs AF and AE processing.

On the other hand, when the face of the photographer has not been detected in the image data obtained by the sub camera unit 230 (NO in the step S115), the CPU 218 starts clocking using the clocking unit 224 (step S119). The CPU 218 then judges whether or not a predetermined time period set in advance has elapsed since the start of clocking by the clocking unit 224 (step S120).

When the predetermined time period has not elapsed since the start of clocking (NO in the step S120), the CPU 218 stands by. On the other hand, when the predetermined time period has elapsed since the start of clocking (YES in the step S120), the process proceeds to the step S118, in which the CPU 218 in turn performs AF and AE processing.

After carrying out the process in the step S118, the CPU 218 performs main shooting using the main camera unit 210 (step S121) and records image data obtained by the main camera unit 210 in the recording medium 222. After that, the CPU 218 starts (that is, resumes) operation of the sub camera unit 230 (step S122). Further, the CPU 218 starts (that is, resumes) operation of the LCD 35 (step S123) and brings the shooting process to an end.

As described above, according to the embodiment of the present invention, when a shooting instruction is issued in the photographer detecting automatic shooting mode, first, a photographer is shot using the sub camera unit 230, and feature quantities thereof are extracted. When a person having the same feature quantities as those feature quantities is present in image data obtained by the main camera unit 210, that is, when the photographer is detected in the image data obtained by the main camera unit 210, main shooting is performed using the main camera unit 210. This reduces erroneous shooting when a person other than a photographer comes within the field of view of the main camera unit 210.

Moreover, according to the embodiment of the present invention, when a photographer is not detected in image data obtained by the sub camera unit 230 before a shooting instruction is issued, for example, a warning to this effect is displayed, and this prompts the photographer to come within the field of view of the sub camera unit 230.

Further, according to the embodiment of the present invention, since a photographer who is a user is notified of a judgment result indicating whether or not the photographer is present in image data obtained by the sub camera unit 230 and hence easily knows the judgment result.

Additionally, according to the embodiment of the present invention, when a photographer is not present in image data obtained by the sub camera unit 230, main shooting is performed with the main camera unit 210 after a lapse of a predetermined time period. This enables what is called timer shooting when a photographer is not present in image data obtained by the sub camera unit 230. Further, when shooting is performed with the sub camera unit 230, the operation of the sub camera unit 230 and the LCD 35 is suspended, and this reduces power consumption of the camera 31.

Although in the embodiment described above, the face of a photographer is detected by the sub camera unit 230, and it is judged whether or not the face of the photographer is present in a subject image obtained by the main camera unit 210, whether or not a photographer is present may be judged using a motion vector of a subject. For example, a motion vector of a subject in image data obtained by the sub camera unit 230 is detected. Then, a direction in which the subject deviates from the field of view of the sub camera unit 230 is detected, and when a subject having the same feature quantities (color, shape, size) as the motion vector is detected in an x-axis direction of the direction in winch the subject deviates in image data obtained by the main camera unit 210, it is determined this subject is a photographer.

A motion vector is obtained by the image processing units 205 and 235 detecting a motion of a subject based on a difference in image data between frames and describes a moving direction and a moving amount of the motion.

As is apparent from the above description, in the example shown in FIG. 2, the CPU 218 and the subject detection unit 226 perform subject detection, and the CPU 218 and the determination unit 223 perform various determination processes. For the blocks in FIG. 2 such as the CPU 218, the subject detection unit 226, and the determination unit 223, dedicated circuits may be used, or programmed processors may be used. Moreover, one circuit or one processor may be equipped with functions of a plurality of blocks.

Moreover, in the embodiment described above, a user places the camera 31 in the photographer detecting automatic shooting mode using the mode selector switch SW 37, and in the step S103 in FIG. 3A, it is judged whether or not the camera 31 is placed in the photographer detecting automatic shooting mode. In the step S103, however, it may be judged wither or not self-timer shooting mode has been selected through user operation, and when self-timer shooting has been selected, the processes in the step S104 and the subsequent steps may be carried out.

When the judgment result is negative (NO) in the step S103 in FIG. 3A, that is, when it is judged that the camera 31 is not placed in the photographer detecting automatic shooting mode (or the self-timer shooting function is not enabled), a normal shooting process is carried out, although this is not mentioned in the above description. In the normal shooting process, in response to a shooting instruction from a user, shooting is performed with the main camera unit 210, and still image data obtained as a result of this shooting is recorded in the recording medium 222.

Moreover, in the embodiment described above, in the step S116 in FIG. 3B, immediately after a photographer is detected by the main camera unit 210, the processes in the step S118 and the step S121 are carried out. However, if shooting is performed immediately after a photographer comes within the field of view of the main camera unit 210, the photographer may be still moving. Therefore, shooting may be performed upon a lapse of a predetermined time period (one second) after a photographer is detected by the main camera unit 210. Also, the main camera unit 210 may continue to detect the face of the photographer, and in response to the position of the detected face of the photographer having stopped moving (over a predetermined distance or longer), shooting may be performed with the main camera unit 210.

Further, although in the embodiment described above, whether or not the predetermined time period has elapsed is judged in the step S117 and the step S119 in FIG. 3B, clocking may be started at the time when a shooting instruction is issued, and the predetermined time period may be a time period set by a self-timer. As a result, when a photographer is not detected, the same operation is performed as one performed with a normal self-timer function, and a user performs shooting without a feeling of strangeness.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-133999, filed Jun. 30, 2014, which is hereby incorporated by reference herein in its entirety.

What is claimed is:

1. An image pickup apparatus having a first image pickup unit and a second image pickup unit, comprising:
    a first detection unit configured to detect a subject from first image data obtained as a result of shooting by the first image pickup unit;
    a second detection unit configured to detect a subject from second image data obtained as a result of shooting by the second image pickup unit; and
    a control unit configured to provide control to, in response to said first detection unit detecting, from the first image data, the subject detected by said second detection unit, carry out a shooting process in which a shooting operation is performed using the first image pickup unit, and image data obtained by the shooting operation is recorded,
    wherein in a case where self-timer shooting is selected, said second detection unit detects the subject from the second image data taken by the second image pickup unit in response to receipt of a shooting instruction, and
    wherein as a result of detection, in a case where the subject is detected by said second detection unit, said control unit provides control to carry out the shooting process using the first image pickup unit in response to said first detection unit detecting the subject detected by said second detection unit, and in a case where the subject is not detected by said second detection unit, said control unit starts clocking and provides control to carry out the shooting process using the first image pickup unit according to a predetermined time period elapsing since start of the clocking.

2. The image pickup apparatus according to claim 1, wherein the second image pickup unit shoots a photographer.

3. The image pickup apparatus according to claim 1, wherein the first image pickup unit and the second image pickup unit differ in shooting direction.

4. The image pickup apparatus according to claim 1, wherein in a case where the self-timer shooting is not selected, said control unit provides control to, in response to a shooting instruction from a user, record the image data obtained as a result of the shooting operation by the first image pickup unit.

5. The image pickup apparatus according to claim 1, further comprising a warning unit configured to display a warning when the said second detection unit has not detected the subject from the second image data obtained as a result of shooting performed by the second image pickup unit in response to the shooting instruction.

6. The image pickup apparatus according to claim 1, wherein in a case where the subject detected by said second detection unit has not been detected by said first detection unit, said control unit starts clocking and provides control to carry out the shooting process using the first image pickup unit according to a predetermined time period elapsing since start of the clocking.

7. The image pickup apparatus according to claim 1, further comprising a display unit configured to display the first image and the second image,
    wherein said second detection unit detects the subject from the second image data taken by said second image pickup unit in response to a shooting instruction, and wherein in response to said second detection unit detecting the subject, said control unit controls said display unit such that the first image and the second image are not to be displayed.

8. The image pickup apparatus according to claim 7, wherein said control unit provides control to display an image obtained by shooting on said display unit in response to the shooting process having been carried out.

9. A control method for an image pickup apparatus having a first image pickup unit and a second image pickup unit, comprising:

detecting a subject from first image data obtained as a result of shooting by the first image pickup unit;

detecting a subject from second image data obtained as a result of shooting by the second image pickup unit; and providing control to, in case that the subject detected from the second image data also is detected from the first image data, carry out a shooting process in which a shooting operation is performed using the first image pickup unit, and image data obtained by the shooting operation is recorded, wherein in a case where self-timer shooting is selected, said detecting a subject from the second image data further comprises detecting the subject from the second image data taken by the second image pickup unit in response to receipt of a shooting instruction, and wherein as a result of detection, in a case where the subject is detected from the second image data, said providing control further comprises providing control to carry out the shooting process using the first image pickup unit in response to the subject detected from the first image data also being detected from said second image data, and in a case where the subject from the first image data is not detected from said second image data, said providing control further comprises starting clocking and providing control to carry out the shooting process using the first image pickup unit according to a predetermined time period elapsing since start of the clocking.

10. A non-transitory computer-readable storage medium storing a program for causing a computer to execute a control method for an image pickup apparatus having a first image pickup unit and a second image pickup unit, the control method comprising:

detecting a subject from first image data obtained as a result of shooting by the first image pickup unit;

detecting a subject from second image data obtained as a result of shooting by the second image pickup unit; and providing control to, in case that the subject detected from the second image data also is detected from the first image data, carry out a shooting process in which a shooting operation is performed using the first image pickup unit, and image data obtained by the shooting operation is recorded, wherein in a case where self-timer shooting is selected, said detecting a subject from the second image data further comprises detecting the subject from the second image data taken by the second image pickup unit in response to receipt of a shooting instruction, and wherein as a result of detection, in a case where the subject is detected from the second image data, said providing control further comprises providing control to carry out the shooting process using the first image pickup unit in response to the subject detected from the first image data also being detected from said second image data, and in a case where the subject from the first image data is not detected from said second image data, said providing control further comprises starting clocking and providing control to carry out the shooting process using the first image pickup unit according to a predetermined time period elapsing since start of the clocking.

* * * * *